United States Patent [19]

Shirakawa et al.

[11] 4,052,172

[45] Oct. 4, 1977

[54] PROCESS FOR GASIFYING COAL OR OTHER CARBON CONTAINING MATERIAL

[75] Inventors: Seiichi Shirakawa; Koji Iwahashi; Akio Nishi; Keisuke Honda, all of Nagasaki, Japan; Kiyomichi Taoda, Hiroshima, all of Japan

[73] Assignee: Mitsubishi Jukogyo Kabushiki Kaisha, Tokyo, Japan

[21] Appl. No.: 592,199

[22] Filed: July 1, 1975

[30] Foreign Application Priority Data

July 3, 1974 Japan .............................. 49-76010

[51] Int. Cl.$^2$ .............................................. C10J 3/46
[52] U.S. Cl. .................................. 48/197 R; 48/202; 48/210; 48/DIG. 4; 201/31
[58] Field of Search ................... 48/73, 76, 77, 63, 64, 48/DIG. 4, 197 R, 202, 210; 201/31; 202/234; 423/563

[56] References Cited

U.S. PATENT DOCUMENTS

| | | | |
|---|---|---|---|
| 2,538,219 | 1/1951 | Welty | 48/206 |
| 2,657,501 | 11/1953 | Mayland | 48/206 |
| 2,662,816 | 12/1953 | Kalbach | 48/202 |
| 2,687,950 | 8/1954 | Kalbach | 48/202 |
| 3,402,998 | 9/1968 | Squires | 423/563 |
| 3,746,522 | 7/1973 | Donath | 48/202 |
| 3,779,725 | 12/1973 | Hegarty et al. | 48/202 |
| 3,782,913 | 1/1974 | Donath | 48/202 |

*Primary Examiner*—Robert L. Lindsay, Jr.
*Assistant Examiner*—George C. Yeung
*Attorney, Agent, or Firm*—Cushman, Darby & Cushman

[57] ABSTRACT

A process and apparatus for gasifying coal or other carbon containing material in which at least a gas stream communicates which comprises providing a fluidizing bed reaction chamber disposed upstream and a jet-system reaction chamber disposed downstream, providing means for supplying an object of gasification such as coal and a gasifying agent in said jet-system reaction chamber, providing a dust removing device at the exit flue of said jet-system reaction chamber, said fluidizing bed reaction chamber having a system of supplying collected solid of said dust removing device, means for supplying a gasifying agent and means for taking out ashes.

5 Claims, 5 Drawing Figures

PROCESS FOR GASIFYING COAL OR OTHER CARBON CONTAINING MATERIAL

The present invention relates to a process and apparatus for gasifying high-temperature, high-pressure coal, or other carbon containing material mainly applicable to a complex system of generating electricity by a gas turbines and a steam turbines.

Heretofore, many studies have been conducted with reference to an apparatus for gasifying coal, or other carbon containing material, and some small-scale gasifying furnaces have been commercialized, however, conventional apparatuses aim at production of a gas as raw material for synthesis or production of a coal gas, none of them being applicable to a large-capacity highly-efficient thermal-power station using coal.

At present, strenuous studies are going on in many countries of the world, however, even if these studies are taken into consideration, what satisfies all the basic conditions required as an apparatus for gasification for generating electricity cannot be found.

When main conditions required of an apparatus for gasification for generating electricity are listed, they become as follows:

a. That the capacity of such apparatus can be made large.
b. That such apparatus can be easily started and stopped and change of a load of such apparatus is easy.
c. That such apparatus can be stably operated.
d. That such apparatus is unlikely to be limited by the kind and particle size of coal.
e. That by using air, such apparatus hardly uses oxygen and even if used, the amount of oxygen is small.
f. That carbon efficiency of such apparatus is high.
g. That the pressure of such apparatus can be made high.

Namely, because an apparatus for gasification for generating electricity uses air as a main gasifying agent, the produced gas is a low calorie gas of 600 Kcal/NM$^3$ – 2000Kcal/Nm$^3$ and storing and transportation of the produced gas are difficult. Accordingly, an apparatus for gasification for generating electricity becomes a part of the electricity generating system and is directly connected to a power plant. Therefore, it is necessary that said apparatus should be in conformity with the conditions of the power plant. It is apparent that as the conditions of a power plant, as the ratio of generation of electricity of atomic energy difficult to vary a load will become high in the future, a coal power plant will be strongly required to be easy in starting and stopping and change of a load as an inevitable consequence.

When conventional gasification furnaces are seen in the light of the aforesaid conditions, it has been held that a Lurgi-type gasification apparatus of a fixed bed system has problems in the aforementioned a, b, d and e, while a Copper-type gasification apparatus has problem in the aforementioned a, c, d, e and f.

When gasification apparatus for generating electricity under study at present are classified in terms of the form of the gasification furnace, except a Lurge-type fixed bed gasification apparatus, they can be classified to a jet system (a system of blowing finely divided coal into a high-temperature atmosphere of a gasification furnace and gasifying said finely divided coal in a floating state in a gasifying agent) and a fluidizing bed system (a system of gasifying powdered coal of a size below several mm in a high-pressure gas in a suspended state on a fluidizing bed).

Namely,

A. Jet system

A jet system gasification apparatus using finely divided coal most sufficiently satisfies the aforementioned requirement of making large the capacity and facilitating starting, stopping and change of a load. On the other hand, because gasification is completed within a short period of time in this system, a high temperature is necessary and the temperature exceeds the melting point of ashes, therefore, fusion of clinkers is brought about on the internal wall, nozzzle and upper flue of the gasification furnace, which tends to become a reason for trouble. In a jet-system gasification furnace under atmospheric pressure, because the capacity of the furnace is large, this problem may be managed to be solved, however, in a high-pressure gasification furnace, because the capacity of the furnace is small, the influence of fusion of clinkers is remarkable, and by conventional high-pressure gasification furnaces having been heretofore proposed, this problem cannot be solved.

B. Fluidizing bed system

In a fluidizing bed-system gasification apparatus, coal is gasified at a temperature in the vicinity of the softening point of ashes or lower, said trouble of clinkers may be avoided, however, for consideration of the relatively large particle size of coal, the reaction temperature is low and the reaction time required for gasification is extremely (generally for several to dozens of minutes) long, therefore, the hold-up of coal in a fluidizing bed is large, the correspondence of the gasification furnace to starting, stopping and change of a load of the power plant is poor and there is a drawback that carbon loss is large because of departure of finely divided char from the fluidizing bed.

Further, as a method of taking out ashes from the fluidizing bed, generally methods of granulating ashes at the lower portion of the furnace are adopted. According to this method, the temperature of the granulating portion is raised to the vicinity of the softening point of ashes, adhering one ash particle to another to increase the particle size and taking out the particles, however, in this method, at the time of sudden stop of the gasification apparatus, the ashes possibly adhere to the peripheral wall inside the furnace to cause trouble.

An object of the present invention is to improve the aforementioned drawbacks of the conventional apparatuses, at the same time, to make a low calorie gas from coal, or other carbon containing material, using air or a gasifying agent consisting mainly of air and steam at a high temperature under a high pressure as a gas used for a complex electricity generating system consisting of gas turbines, a waste heat boilers and steam turbines, etc.

Another object of the present invention is to provide a most ideal gasification apparatus which is large in capacity of one machine, excellent in correspondence to change in kind of coal, capable of utilizing coal to its finely divided particles, using as a gasifying agent, inexpensive air mainly or completely, little in trouble of adherence due to cooking property of coal and little in trouble due to fusion of ashes at the time of gasification, and excellent in correspondence of a gasification furnace to start, stop and change of a load most strongly required as a power plant.

Hereinbelow, examples of the apparatus for gasifying coal, etc. according to the present invention will be specifically explained based on the accompanying drawings.

FIGS. 1 and 2 illustrate the first embodiment
FIG. 3 illustrates the second embodiment
FIG. 4 illustrates the third embodiment.
FIG. 5 illustrates the fourth embodiment.

In FIG. 1 through FIG. 5, the same numeral shows the same part or a portion carrying out the same function.

Figure 1:
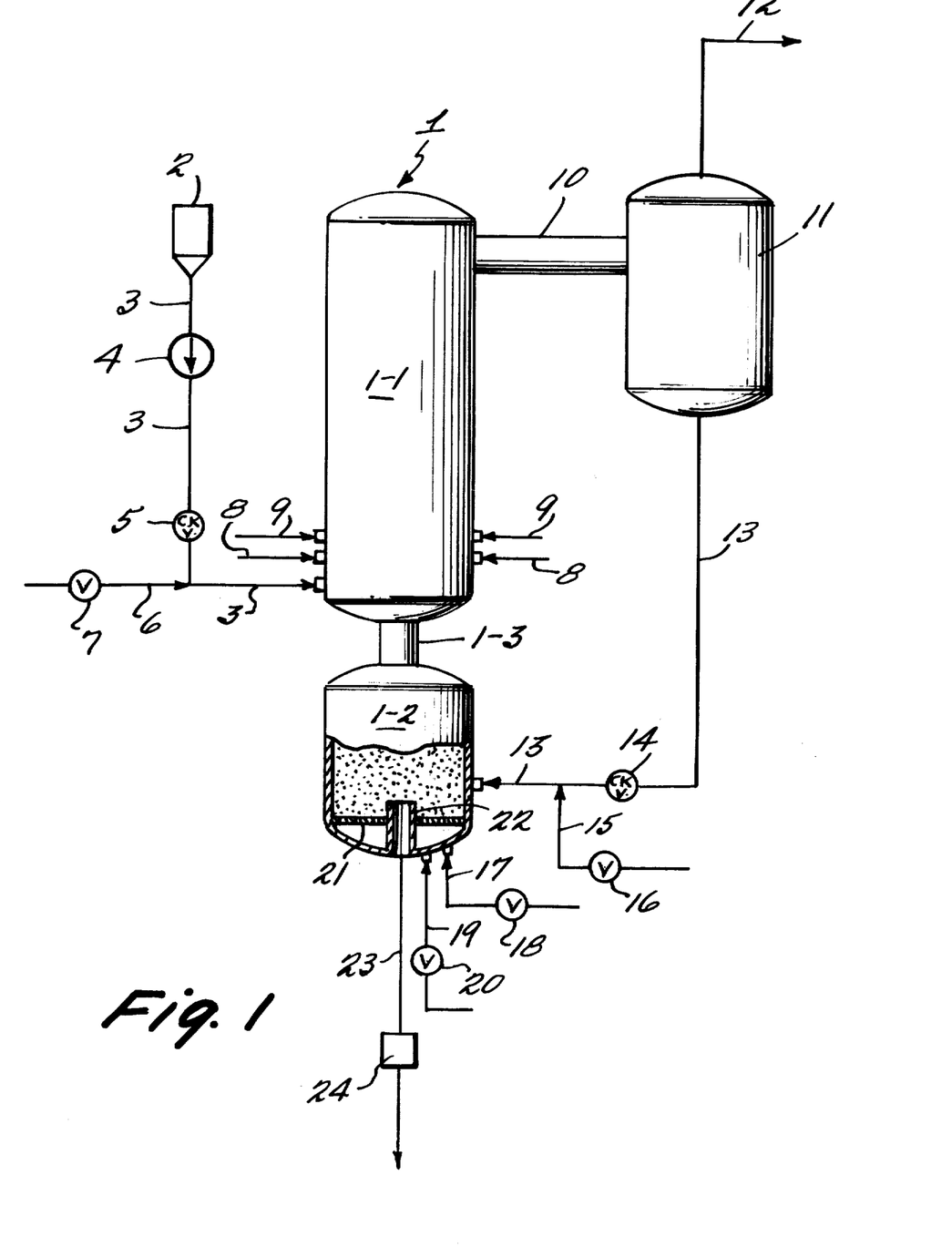
FIG. 1 to FIG. 5 are schematic views showing embodiments of the apparatus for gasifying coal, or other carbon containing material according to the preent invention.
Figure 2:
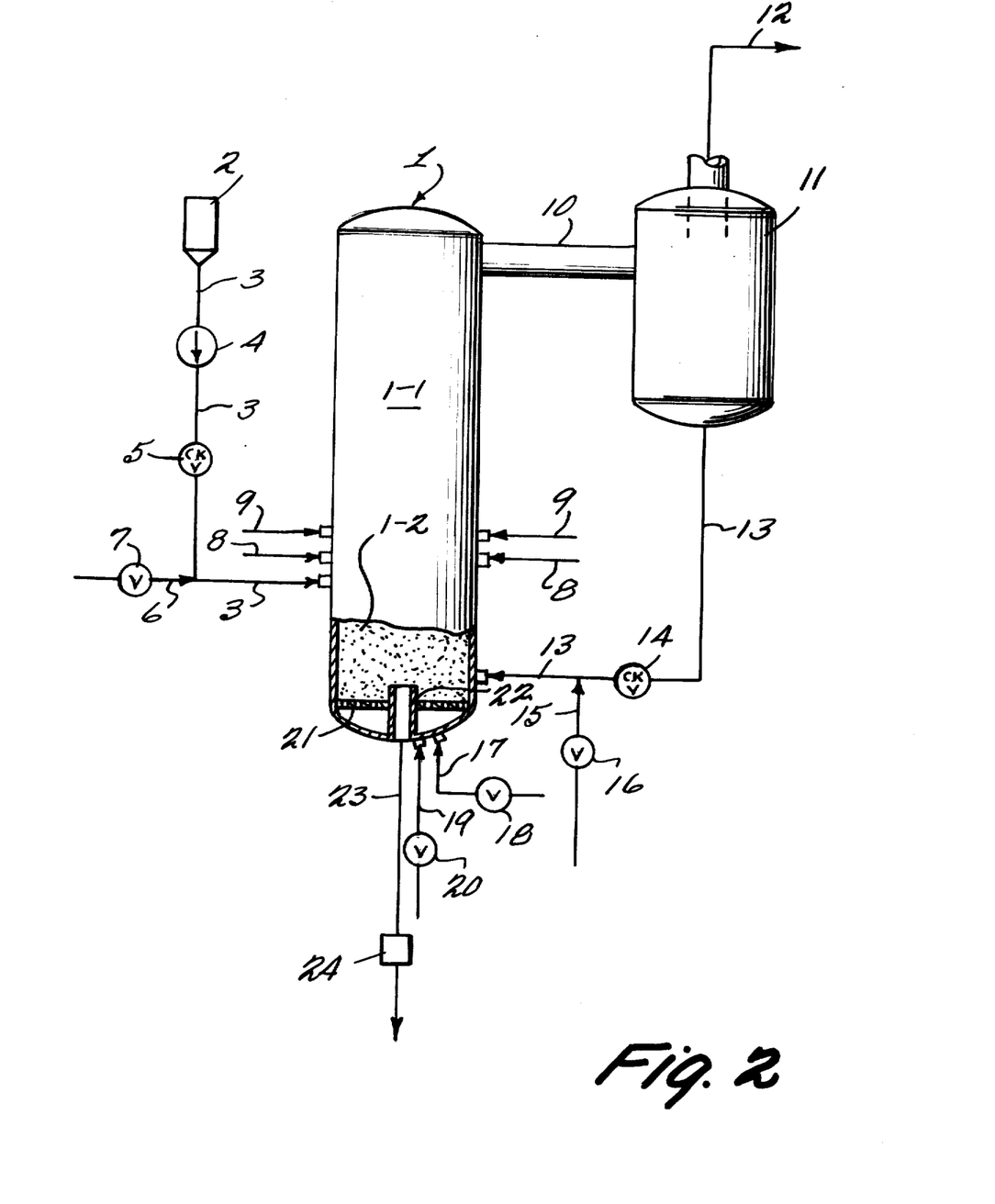

FIG. 1 and FIG. 2 show embodiments of the first invention of the apparatus of the present invention, respectively. In FIG. 1 and FIG. 2, (1) is a gasification apparatus proper providing a fluidizing bed reaction chamber 1-2 disposed upstream of the flow of gas and a jet-system reaction chamber 1-1 disposed downstream of the flow of gas, 2 is a hopper for a material to be gasified such as coal, (3) is a supply pipe one side of which is connected to the lower side of said hopper 2, provided with a constant quantity supply device 4 and a check valve 5 in the pipe passage and the other side of which supply pipe opens in a nozzle-like state into said jet-system reaction chamber 1-1.

6 is a high-speed fluid supply pipe, one side of which is connected to downstream of said check valve 5 of said supply pipe 3, provided with a flowing amount control valve 7 in the pipe passage and another side of which supply pipe is connected to a high-pressure fluid source (not shown). 8 and 9 are gasifying agent supply pipers, one sides of which are connected to said jet-system reaction chamber 1-1 respectively, for example, 8 is a high-pressure air supply pipe and 9 is a high-pressure overheated steam supply pipe and the other sides of which supply pipes are connected to a high-pressure air supply source and a high-pressure overheated steam supply source (both not shown). 10 is an exit flue (flue of the exit), one side of which is connected to the upper part of said jet-system reaction chamber 1-1 is a dust removing device to the side of which, the other side of said exit flue 10 is connected and provided with a produced gas take-out pipe 12 at the upper part thereof, 13 is a collected solid transfer pipe, one side of which is connected to the lower part of said dust removing device, provided with a check valve 14 in the pipe passage and the other side of which pipe opens to the fluidizing bed reaction chamber 1-2 15 is a high-pressure fluid (for example, air or steam or a produced gas) supply pipe, one side of which is connected to said collected solid transfer pipe 13 downstream of said check valve 14, provided with a flowing amount control valve 16 in the pipe passage and the other side of which pipe is connected to a high-pressure fluid source (not shown), 17 and 19 are supply pipes, one sides of which are connected to the lower part of said fluidizing bed reaction chamber 1-2, respectively, provided with flowing amount control valves 18 and 20 in the pipe passage, respectively and the other sides of which pipes are connected to a gasifying agent supply source (not shown), for example, 17, is a high-pressure air pipe and 18 is a high-pressure overheated steam pipe. 21 is a gasifying agent dispersing device provided in the vicinity of the lower part of said fluidizing bed reaction chamber 1-2, 22 is an ash take-out guide pipe provided inside said fluidizing bed reaction chamber 1-2, and 23 is an ash take-out pipe, one side of which is connected to said ash take-out guide pipe 22 and provided with a lock hopper 24 in the pipe passage.

The difference between the apparatuses of FIG. 1 and FIG. 2 is that in the apparatus shown in FIG. 1, a gas communicating pipe 1-3 is provided midway between the jet-system reaction chamber 1-1 the fluidizing bed reaction chamber 1-2 constituting the gasification apparatus proper.

In apparatuses shown by FIG. 1 and FIG. 2, a material to be gasified (coal finely divided to 100 – 200 mesh (ASTM), urban waste of coarse oil, hereinafter coal will be taken as an example of the material to be gasified and explained) of the hopper for a material to be gasified 2 is blown from the supply pipe 3 by the constant quantity supply device 4 into the lower portion inside the jet-system reaction chamber 1-1 having a pressure of about 10 kg/cm² – 20 kg/cm² together with a fluid for transportation, for example, high-pressure air supplied from the high-pressure fluid supply pipe 6. While the material to be gasified blown in rises inside the jet-system reaction chamber 1-1 together with a gasifying agent such as air and overheated steam blown in from the high-pressure air supply pipe 8 and the high-pressure overheated steam supply pipe 9 and a high-temperature hot gas supplied from the fluidizing bed reaction chamber 1-2, said material is rapidly carbonized at a high temperature of 800° C – 1100° C to produce char (carbide) and subsequently to be gasified as shown in the following formulae $$C + O_2 \rightarrow CO_2$$

and to produce a crude gas:

$$C + \tfrac{1}{2}O_2 \rightarrow CO^2$$
$$C + CO_2 \rightarrow 2CO$$
$$C + H_2O \rightarrow H_2 + CO$$

The produced crude gas and the unreacted char reach the dust removing device 11 via the exit flue 10. In the dust removing device 11, the crude gas is separated from the char, and the resultant clean gas is supplied to, for example, the combustion chamber of a gas turbine of a complex power plant via a desulfurizing and dust removing device (not shown).

The ashes and unreacted char separated from the produced gas in the dust removing device 11 are forwarded from the high-pressure fluid supply pipe 15 via the collected solid transfer pipe 13 and they are supplied to the fluidizing bed reaction chamber 1-2 together with, for example, high-pressure air. At the same time, from the gasifying agent supply pipes 17 and 19, high-pressure air and overheated steam are blown in, respectively via the dispersing device 21, and unreacted char supplied into the fluidizing bed reaction chamber 1-2 is burnt or gasified in a fluidized state, and a high-temperature hot gas produced is, as mentioned above, supplied to the lower part of the jet-system reaction chamber 1-1. On the other hand, ashes produced are forwarded from the ash take-out pipe 23 via the ash take-out guide pipe 22 to the lock hopper 24, where the pressure of the ashes is returned to atmospheric pressure and taken out to the outside.

The first embodiment of the apparatus of the present invention in which at least a gas stream communicates which comprises providing a fluidizing bed reaction chamber disposed upstream and a jet-system reaction chamber disposed downstream, providing in said jet-system reaction chamber, means for supplying a material to be gasified such as coal and a gasifying agent, providing in the exit flue of said jet-system reaction chamber, a dust removing device, said fluidizing bed reaction chamber having a system of supplying collected solid of said dust removing device, at the same time, having means for supplying a gasifying agent and means for taking out ashes, therefore, it has the following excellent advantages.

1a. There is no trouble in clinkers in concomitance with adherence of ashes.

In a finely divided coal jet-system gasification furnace, because the residence time of coal in the furnace is short, the gasifying speed of coal is fast, and because gasification is carried out at a high temperature, ashes in a high-temperature atmosphere are in a molten state. In a high-pressure gasification apparatus utilized for a complex electricity generating system, the capacity of the furnace is small and adherence of fused ashes to the internal wall of the furnace becomes a large obstacle. In the apparatus of the present invention, despite the fact that it is of a jet system of finely divided coal, carbonization and gasification of coal as well as combustion or gasification of the unreacted char are carried out at a relatively low temperature without adherence of ashes, therefore, trouble such as blockade due to fusion of ashes can be avoided.

1b. By possesing a finely divided coal jet-system reaction chamber, it has the characteristics of a jet-system gasification furnace of easiness to make large the capacity, good followability to start, stop and change of a load, non-limitation by the kind and particle size of coal and non-existence of a product harmful or requiring a treatment due to complete gasification. These characteristics are derived from the fine particle size of coal, large surface area of coal, and thin thickness of a produced ash layer, on account of which the gasification speed of coal is fast as compared with a fluidizing bed at the same temperature and under the same partial pressure of gas, the hold-up amount is small and the coking property of coal repidly disappears. For example, because there is little limitation in size of a gasification chamber and in number and disposition of burner nozzles, expansion in capacity of the treated amount of coal per one gasification furnace, start, stop and change of a load of the gasification furnace are easy and the first invention of the apparatus of the present invention is suitable for a large-capacity thermal power station.

1c. By combining the jet-system reaction chamber with the fluidizing bed reaction chamber, not only the present invention concurrently has the characteristics of the two, but also has a great characteristics that consideration is so made as not to bring about fusion of ashes inside the furnace and the reaction time is short. Originally, the two systems are greatly different in the range of operating temperature and particle size of coal, and such coal gasification apparatus as that of the present invention has heretofore been not seen.

For example, in an ordinary fluidizing bed gasification system, at the particle size of coal of about 3 mm and under, the residence time of 30 – 50 minutes is necessary, the hold-up of coal is often and correspondence to start, stop and change of a load becomes poor.

The present invention is characterized by combination of the jet system and the fluidizing bed system as mentioned above, by the use of finely divided coal, the apparatus of the present invention not only has the effect mentioned in 1a, above, but also in the fluidizing bed, time required for combustion or gasification is greatly shortened by the same reason as mentioned in 1b, above, hold-up of the char is less often by thaat proportion and correspondence to start, stop and change of a load is improved.

In the fluidizing bed reaction chamber using finely divided coal, by raising the reaction temperature to one close to the softening point of ashes and selecting conditions under which one ash adheres to another to some extent and being made into particles, a granulation phenomenon is brought about in ashes and finely divided particles of the unreacted char and the particles produced form a fluidizing bed.

1d. The system of the present invention is suitable essentially as a high-pressure coal gasification apparatus used for a complex electricity generating (power) system consisting of gas turbines and steam turbines. Namely, in order to make a gasification apparatus, a high-pressure type, it is easier to do so when the capacity of a gasification furnace is small. However, in an ordinary jet-system gasification apparatus, because ashes are fused, the problem of the size of capacity may be managed to be dealt with somehow or other when the pressure is atmospheric pressure, but in a high-pressure type in which the capacity of a gasification furnace is small, the adhered amount of ashes is large for the capacity of the furnace and trouble becomes more remarkable. Also, in the case of a high pressure, it is difficult to remove ashes tightly fused, therefore, trouble is increased in this respect also.

1e. A crude low-calorie gas produced at the exit of the gasification apparatus is, when subsequently used in combination wit a high-temperature, high-pressure dust removing device or a desulfurization and dust removing device, able to keep the temperature of a produced gas high at the entrance of the burner of a gas turbine, therefore, suffice it to obtain a generated amount of heat of above about 600 Kcal/Nm$^3$, which is in a very advantageous direction as conditions on the side of the gasification apparatus.

Figure 3:
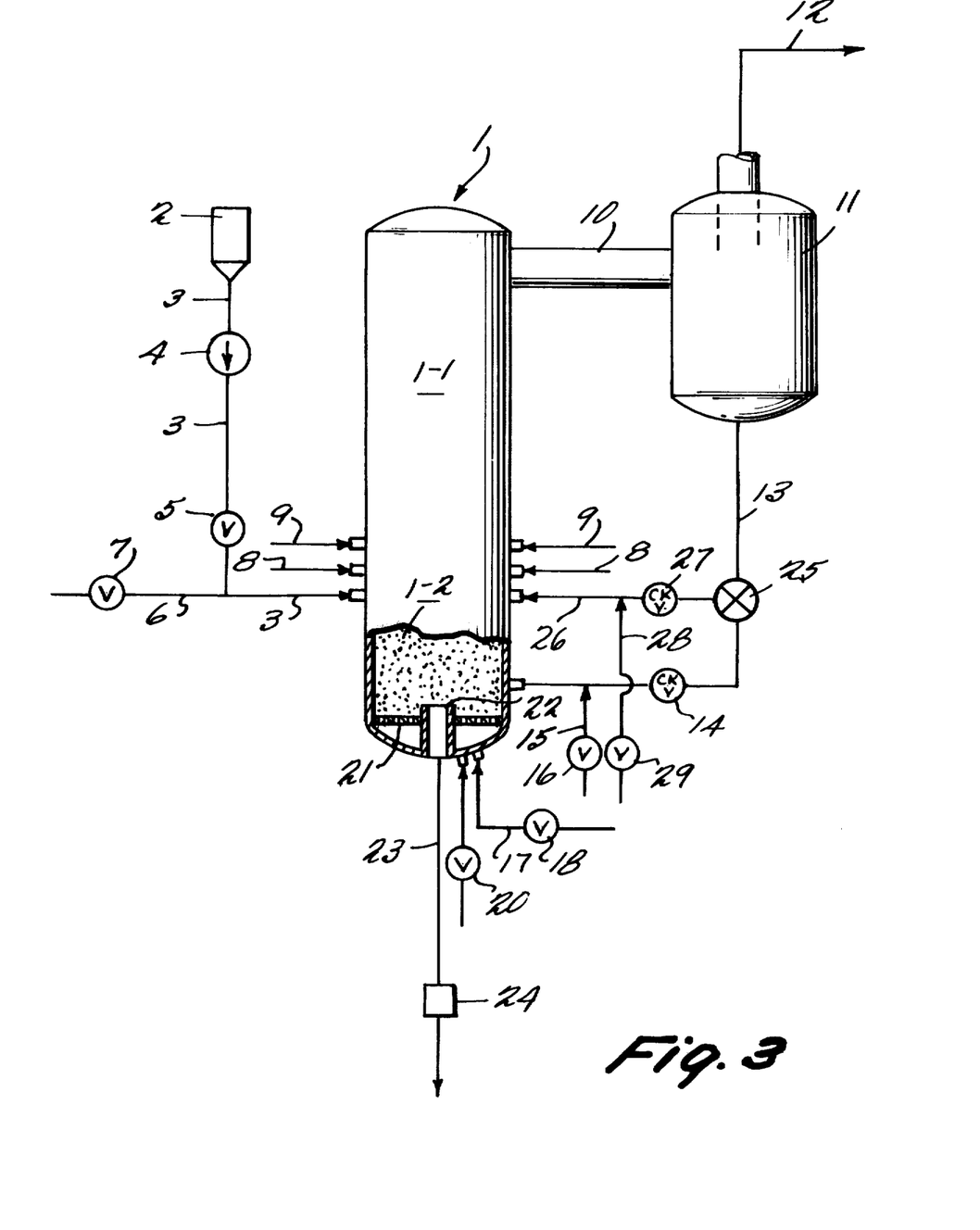

FIG. 3 shows the second embodiment of the apparatus of the present invention. In FIG. 3, 25 is a collected solid distributor provided in a collected solid transfer pipe 13, and 26 is a collected solid circulation, transfer pipe, one side of which is connected to said collected solid distributor 25, provided with a check valve 27 in the pipe passage and the other side of which pipe opens to a jet-system reaction chamber 1-1. 28 is a high-pressure fluid supply pipe, one side of which is connected to said collected solid circulation transfer pipe 26 on the downstream side of the chech valve 27, provided with a flowing amount control valve 29 in the pipe passage. As a high-pressure fluid, for example, air, steam of a produced gas may be used.

In such way, it is possible to constitute a circular passage connecting the jet-system reaction chamber 1-1, exit flue 10, dust removing device 11, collected solid transfer pipe 13, collected solid distributor 25 and collected solid circulation, transfer pipe 26. Accordingly, a part of ashes and unreacted char collected and separated in the dust removing device 11 is supplied by the collected solid distributor 25 via the collected solid transfer pipe 13 to, for example, the lower part of the jet-system reaction chamber 1-1 from the collected solid circulation, transfer pipe 26 and rises inside the jet-system reaction chamber 1-1 while further undergoing gasification by a hot gas supplied from a fluidizing bed reaction chamber 1-2, high-pressure air and high-pressure overheated steam supplied from gasifying agent supply pipes 8 and 9 to reach the dust removing device 11 via the exit flue 10.

The second embodiment of the apparatus of the present invention has a system of circulating and supplying a part of the collected solid of the dust removing device, namely, a part of the unreacted char collected and separated into the jet-system reaction chamber 1-1, therefore, it has the following excellent advantages.

2a. As mentioned above, by providing a system of circulating and supplying the primary component of the collected solid, for example, char into the jet-system reaction chamber 1-1, it is possible to take long the reaction time of char in the jet-system reaction chamber 1-1 and by properly establishing the circulation ratio of the char in the collected solid distributor 25, it is possible to easily control a reaction time required for gasification of the char, therefore, coal of any kind, accordingly coal having any reaction rate may be gasified.

As the gasification proceeds, the ash content in the particles of the reacted char increases and the gasification reaction rate lowers, however, because they are finally subjected to a combustion treatment faster in reaction rate, the entire reaction time is short and the carbon-utilizing ratio becomes high.

2b. By possessing the aforementioned system of circulating and supplying char, the gasification ratio in the jet-system reaction chamber rises, therefore, it is possible to freely control the amount of the unreacted char in the circulating char supplied to the fluidizing bed reaction chamber, accordingly, it becomes possible to freely select the optimum combustion and gasification conditions in the fluidizing bed or conditions such as the flowing speed of the gasifying agent, and it is possible to sufficiently burn and gasify the finely divided coal while repressing departure of the finely divided coal in the fluidizing bed reaction chamber to the minimum level.

Figure 4:
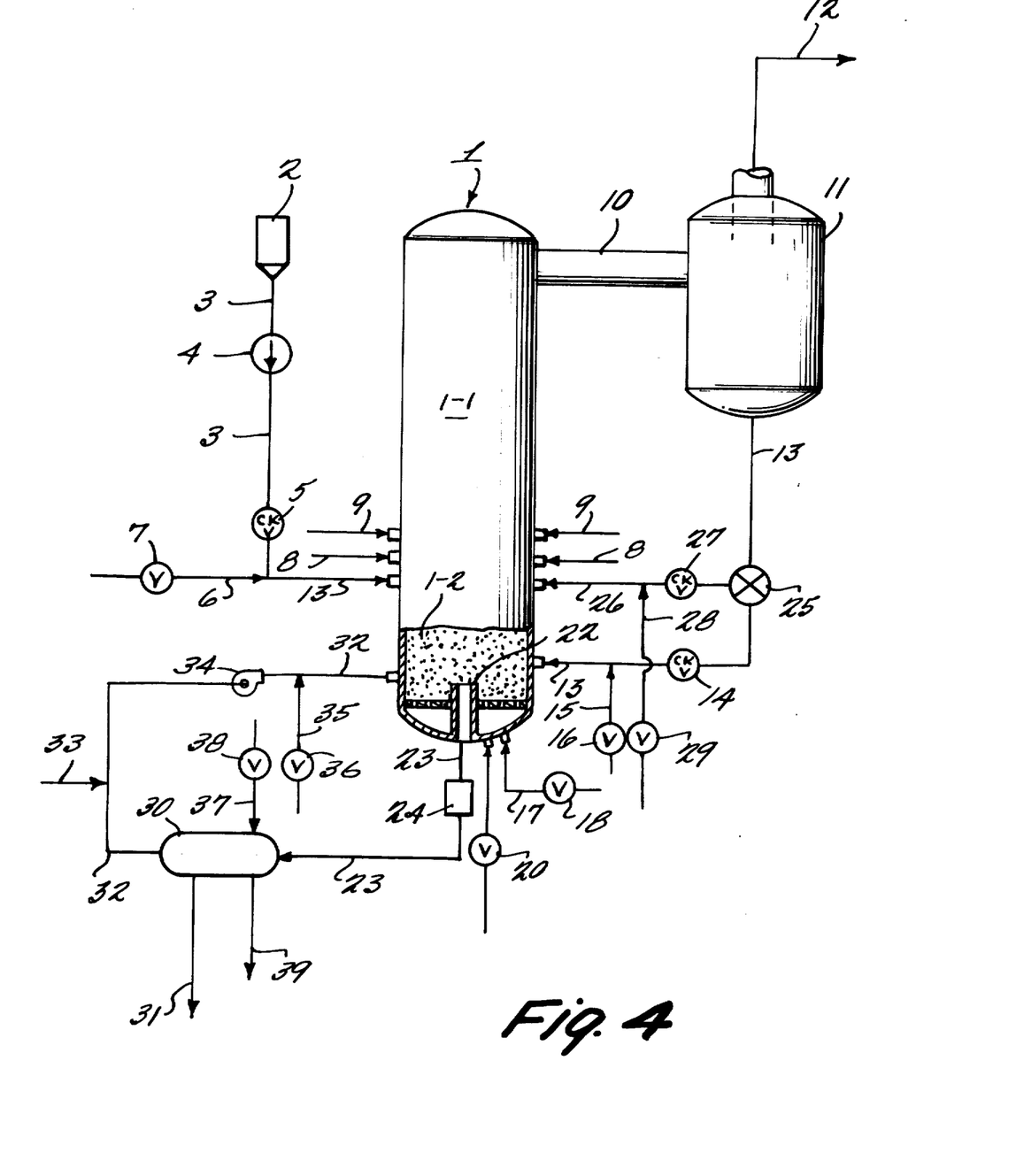

FIG. 4 shows the third embodiment of the apparatus of the present invention. In FIG. 4, 30 is an ash separator, the entrance side of which is connected to another side of an ash take-out pipe 23, 31 is an ash take-out pipe, one side of which is connected to said ash separator 30, and 32 is a fluidizing medium circulation, transfer pipe, one side of which is connected to the exit side of said ash separator 30, the pipe passage of which is connected to a fluidizing medium supply pipe 33, a fluidized medium supply device 34 is provided in said pipe passage and the other side of which pipe 32 opens to the fluidizing bed reaction chamber 1-2. In this FIG. 4, an explanation is made in the form of a transfer pipe, however, said 32 is not necessarily limited thereto, but other transportation means such as conveyor may be applied as transfer mans 35 is a high-pressure fluid supply pipe, one side of which is connected to said transfer pipe 32 of the downstream side and provided with a flowing amount control valve 36 in the pipe passage. 37 is a fluid blow-in pipe, one side of which is connected to said ash separator 30 and provided with a flowing amount control valve 38 in the pipe passage. 39 is a fluid discharge pipe, one side of which is connected to said ash separator 30. However, depending upon the form of said ash separator 30, said fluid blow-in pipe 37 and said fluid discharge pipe 39 need not necessarily be provided.

In FIG. 4, from the fluidizing medium supply pipe 33, a fluidizing medium composed of inert particles having a particle size larger than that of finely divided coal, for example, sand, is supplied to the transfer pipe 32 and supplied to the fluidizing bed reaction chamber 1-2 together with a high-pressure fluid forwarded from said supply pipe 35 via said supply device 34. In the fluidizing bed reaction chamber 1-2, said fluidizing medium forms a fluidizing bed by high-pressure fluids supplied from high-pressure fluid supply pipes 17 and (19, not shown). A part of said fluidizing medium is taken out together with ashes, from an ash take-out guide pipe 22 and reaches the ash separator 30 via the ash take-out pipe 23 and a lock hopper 24, where 30 ashes are separated from the fluidizing medium, the separated ashes are taken out from the take-up pipe 31 and transferred to ash scrap facilities (not shown). The remaining fluidizing medium is again circulated and supplied to the fluidizing bed reaction chamber 1-2 via the transfer pipe 32 and the supply device 34. The fluid blow-in pipe 37 and the fluid discharge pipe 39 are used as supply and discharge pipe passages when separation of ashes from the fluidizing medium is carried out in the form of cyclone in the ash separator 30, and depending upon the form of separating ashes such as separation by gravity, they are not used.

The third embodiment of the apparatus of the present invention has means for supplying the fluidizing medium to the fluidizing bed reaction chamber and means for taking out the fluidizing medium together with ashes from the same fluidizing bed reaction chamber, by which it has the following excellent advantages.

3a. By adding the fluidizing medium it has a proper gas speed for foming a fluidizing bed, at the same time, it is possible to form a fluidizing bed in which combustion or gasification of char is possible by finely divided char and ashes, and under conditions of substantially no adhesion of pulverized bodies, by repressing departure of the finely divided particles from the fluidizing bed to a relatively small state, combustion or gasification of the finely divided chars become possible in the fluidizing bed.

3b. Because the pulverized bodies are in the aforesaid conditions of substantially no adhesion, clinker trouble due to fused ashes can be avoided, at the same time, stop of the fluidizing bed may be immediately effected by mere stop of a gasifying agent for fluidization and start of fluidization may be immediately effected by mere sending of the same gasifying agent, and the reaction in the fluidizing bed may be started by raising the temperature of the fluidizing layer. Therefore, the operation is very simple and quick. Accordingly, the correspondence to start, stop and change of a load of a gasification furnace is excellent. And the third invention of the apparatus of the present invention may be called suitable as a high-pressure gasification apparatus for a complex power plant.

Figure 5:
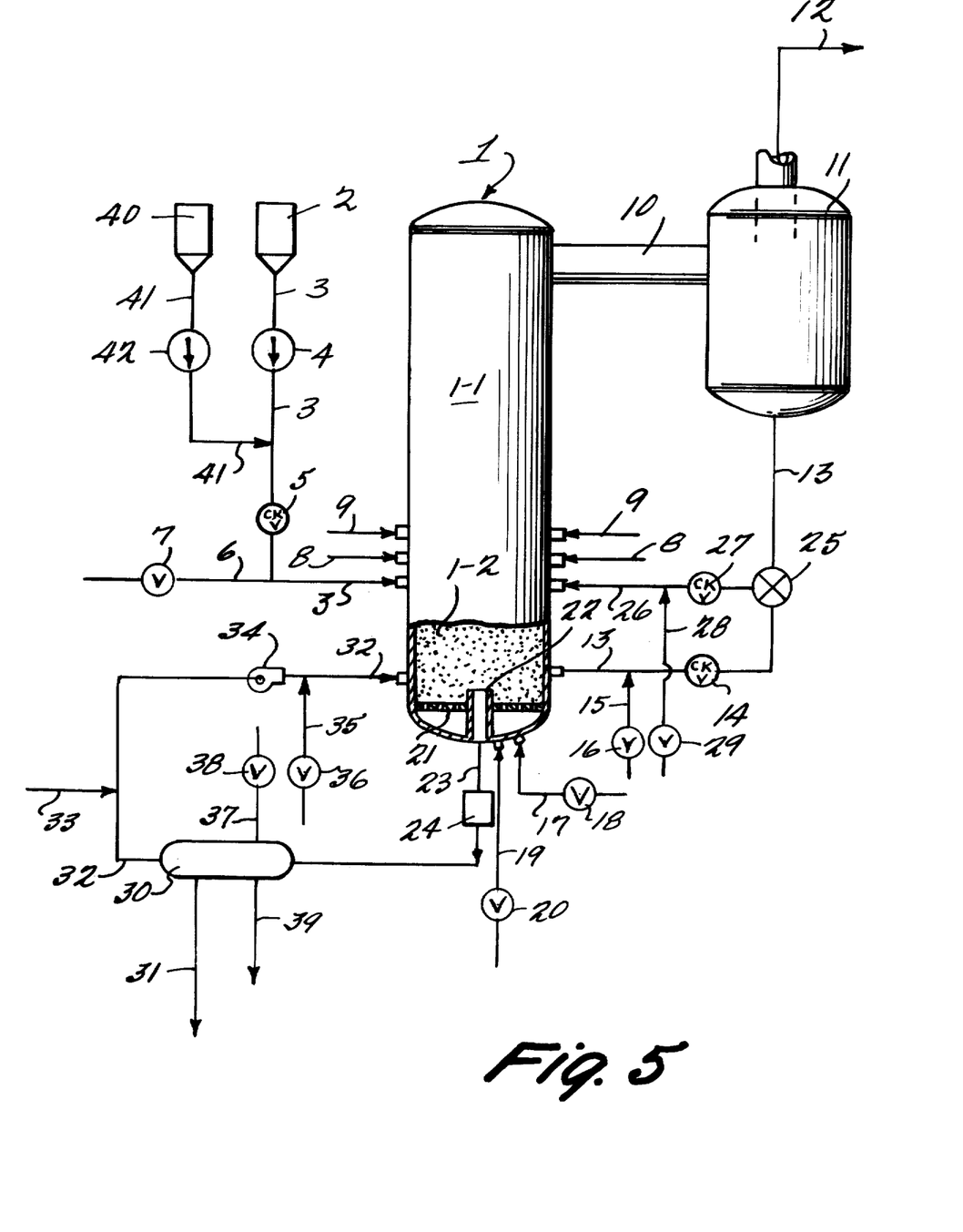

FIG. 5 shows the fourth embodiment of the apparatus of the present invention. In FIG. 5, 40 is a hopper for a desulfurizing agent, 41 is a desulfurizing agent supply pipe, one side of which is connected to the lower part of said hopper 40, provided with a constant quantity supply device 42 in the pipe passage and the other side of which 41 is connected to a supply pipe 3 beteen a device for supplying a constant quantity of a material to be gasified 4 and a check valve 5. Said desulfurizing agent supply pipe 41 may be directly opened to a jet-system reaction chamber 1-1 as a matter of fact.

As a desulfurizing agent, for example, finely divided particles of a calcium salt such as lime stone and dolomite are supplied from said hopper for a desulfurizing agent 40 via said constant quantity supply device 42 to the pipe for supplying a material to be gasified 3. Via said supply pipe 3, said particles of a calcium salt are blown into a jet-system reaction chamber 1-1 together with the material to be gasified. Said particles react with hydrogen sulfide produced from the material to be gasified to produce calcium sulfide in said reaction chamber 1-1. The calcium sulfide so produced is introduced together with ashes and the unreacted char into a dust removing device 11 via an exit flue 10. In the dust removing device 11, the calcium sulfide is separated from a crude produced gas, and introduced together with ashes, unreacted char and unreacted calcium salt into a collected solid distributor 25 via a collected solid transfer pipe 13. In the collected solid distributor 25, a part of them is circulated and supplied to the jet-system reaction chamber 1-1 via a collected solid circulation, transfer pipe 26, in said reaction chamber 1-1, the unreacted calcium salt further undergoes said reaction, absorbing hydrogen sulfide to produce calcium sulfide. On the other hand, from said collected solid distributor 25, the remaining ashes, unreacted char, produced calcium sulfide and unreacted calcium salt are forwarded to a fluidizing bed reaction chamber 1-2 via the transfer pipe 13, where 1-2 calcium sulfide is oxidized to gypsum by oxygen in a gasifying agent, stabilized and thereafter reaches an ash separator 30 via an ash take-out guide pipe 22 and an ash take-out pipe 23, where 30 the gypsum is separated together with ashes and discharged to the outside of the system from an ash take-out pipe 31.

The fourth embodiment of the apparatus of the present invention has a system of supplying a desulfurizing agent in the jet-system reaction chamber, by which it has the following excellent advantages.

4a. Hydrogen sulfide in a crude produced gas produced inside the jet-system reaction chamber being separated from the crude produced gas as, for example, calcium sulfate, the produced gas is a clean gas containing trace of hydrogen sulfide only.

4b. Because the aforesaid desulfurization reaction is carried out simultaneously with gasification inside the jet-system reaction chamber, desulfurization may be achieved by inexpensive facilities by providing a device for supplying, for example, a calcium salt as a desulfurizing agent.

4c. In the fluidizing bed reaction chamber, by oxidizing the aforesaid calcium sulfide to stable gypsum, ashes may be easily treated without bringing about environmental pollution without providing any special apparatus.

What is claimed is:

1. A process for gasifying coal or other carbon containing material in which a gas stream communicates, comprising:

providing a fluidizing bed reactor chamber (1-2) disposed upstream and a jet-system reaction chamber (1-1) disposed downstream with respect to said gas stream, providing means for supplying coal or other carbon containing material divided to 100–200 mesh (ASTM) and a gasifying agent selected from the group consisting of air and mixtures of air and steam (8,9) in sad jet-system reaction chamber (1-1), and providing a dust removing device (11) at the exit flue (10) of said jet-system reaction chamber (1-1), said fluidizing bed reaction chamber (1-2) having a pipe means (13) for supplying collected solid of said dust removing device (11), means for supplying said gasifying agent (17), and means for taking out ashes (23).

2. A process according to claim 1 having distributor means (25) for circulating and supplying a part of said collected solid of sid dust removing device to said jet-stream reaction chamber.

3. A process according to claim 1 having means for supplying a fluidizing medium to said fluidizing bed reaction chamber and means for taking out said fluidizing medium together with ashes from said fluidizing bed reaction chamber.

4. A process according to claim 3, wherein said jet-system reaction chamber has hopper means (40) for supplying a desulfurizing agent.

5. A process according to claim 1 including rapidly carbonizing said coal or other carbon containing material in the presence of said gasifying agent and a high-temperature hot gas supplied from said fluidizing bed reaction chamber (1-2) at a temperature of 800° to 1100° C.

* * * * *